United States Patent
Aonuma

(10) Patent No.: US 7,852,512 B2
(45) Date of Patent: Dec. 14, 2010

(54) COLOR IMAGE PROCESSING DEVICE AND MEDIUM EMPLOYED FOR THE SAME

(75) Inventor: Koki Aonuma, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 694 days.

(21) Appl. No.: 11/755,468

(22) Filed: May 30, 2007

(65) Prior Publication Data

US 2007/0279662 A1 Dec. 6, 2007

(30) Foreign Application Priority Data

May 30, 2006 (JP) .............................. 2006-150067

(51) Int. Cl.
  *H04N 1/60* (2006.01)
  *H04N 1/46* (2006.01)
  *G06K 9/00* (2006.01)

(52) U.S. Cl. .................. 358/1.9; 358/500; 358/504; 358/518; 358/520; 358/523; 358/3.01; 382/162; 382/167; 382/172; 382/275

(58) Field of Classification Search ............ 358/1.9, 358/523, 504, 3.23, 518–520, 522, 3.01, 358/500, 514; 382/162, 167, 168, 172, 275, 382/225; 345/590, 604

See application file for complete search history.

(56) References Cited

U.S. PATENT DOCUMENTS

2002/0000993 A1* 1/2002 Deishi et al. ............... 345/590

FOREIGN PATENT DOCUMENTS

| JP | 2000253269 | 9/2000 |
| JP | 2004-320190 | 11/2004 |

OTHER PUBLICATIONS

Notification of Reasons for Rejection for corresponding Japanese Patent Application No. 2006-150067 mailed Apr. 22, 2008.

* cited by examiner

*Primary Examiner*—Charlotte M Baker
(74) *Attorney, Agent, or Firm*—Banner & Witcoff, LTD

(57) ABSTRACT

A color image processing device configured to process input color image data includes a specifying unit configured to specify a gray region including a gray axis within a color gamut of the input color image data in a color space, a first setting unit configured to set a first gray stabilization region away from the gray axis in the color space so as to satisfy a predetermined condition, and a first transferring unit configured to transfer each color within the gray region specified by the specifying unit into the first gray stabilization region.

19 Claims, 13 Drawing Sheets

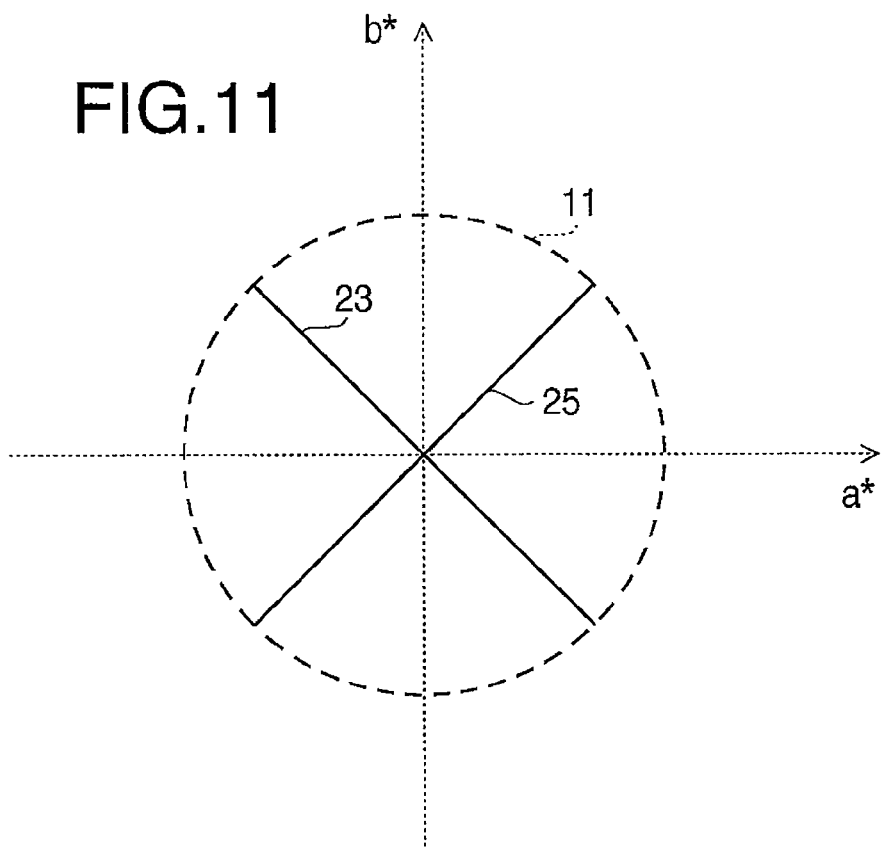
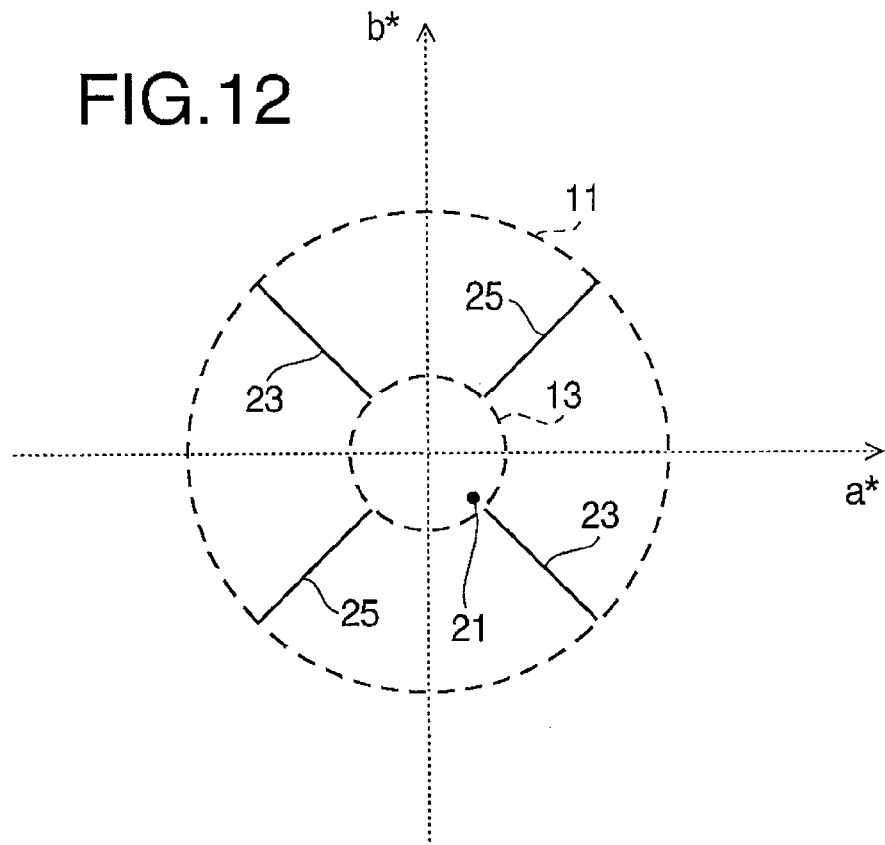

COLOR IMAGE PROCESSING DEVICE AND MEDIUM EMPLOYED FOR THE SAME

CROSS-REFERENCE TO RELATED APPLICATION

This application claims priority under 35 U.S.C. §119 from Japanese Patent Application No. 2006-150067, filed on May 30, 2006. The entire subject matter of the application is incorporated herein by reference.

BACKGROUND

1. Technical Field

The following description relates to one or more techniques that can make a hue deviation, which could be caused when a color image output device such as a color printer and a color display device expresses a gray color, less noticeable.

2. Related Art

There can be some cases where a color gamut that a color image output device such as a color printer and a color display device can output is narrower than a color gamut of input color image data. In order to solve the aforementioned problem, conventionally, there is performed data processing to convert the input color image data so as to conform the color gamut thereof to a color gamut of the color image output device. The color image output device then forms a color image based on the converted color image data (see Japanese Patent Provisional Publication No. 2000-253269).

Among various color image output devices, a printer expresses various colors by changing a ratio of four process colors (CMYK). However, there might be some cases where a ratio of the four process colors in an actually formed color image deviates from an ideal ratio set for the input color image data. For example, in a case of an inkjet printer, the ratio of the four process colors is adjusted by a discharge ratio of the four process colors that can be affected by a mechanical configuration of an inkjet head. For this reason, an actual discharge ratio of the four process colors could deviate from the ideal ratio set for the input color image data.

In this case, a color in the actually formed color image deviates from an ideal color to be expressed by the input color image data. Especially, a hue deviation of a gray color that could be caused by an image forming operation is likely to be noticeable in the actually formed color image, since even a slight hue deviation can cause a change of the gray color across an axis of a color space such as an L*a*b color space.

SUMMARY

Aspects of the present invention are advantageous in that there can be provided one or more improved techniques that can make a hue deviation, which could be caused when a color image output device expresses a gray color, less noticeable.

BRIEF DESCRIPTION OF THE ACCOMPANYING DRAWINGS

FIG. 1 is a functional block diagram schematically showing a configuration of an image processing device in accordance with one or more aspects of the present invention.

FIGS. 2, 3, and 4 are illustrations for explaining interpolation calculation to be performed by the image processing device in accordance with one or more aspects of the present invention.

FIG. 11 schematically shows the input color image data before the gray stabilization process is performed therefor in the first embodiment in accordance with one or more aspects of the present invention.

FIG. 12 schematically shows the input color image data after the gray stabilization process has been performed therefor in the first embodiment in accordance with one or more aspects of the present invention.

Figure 13:
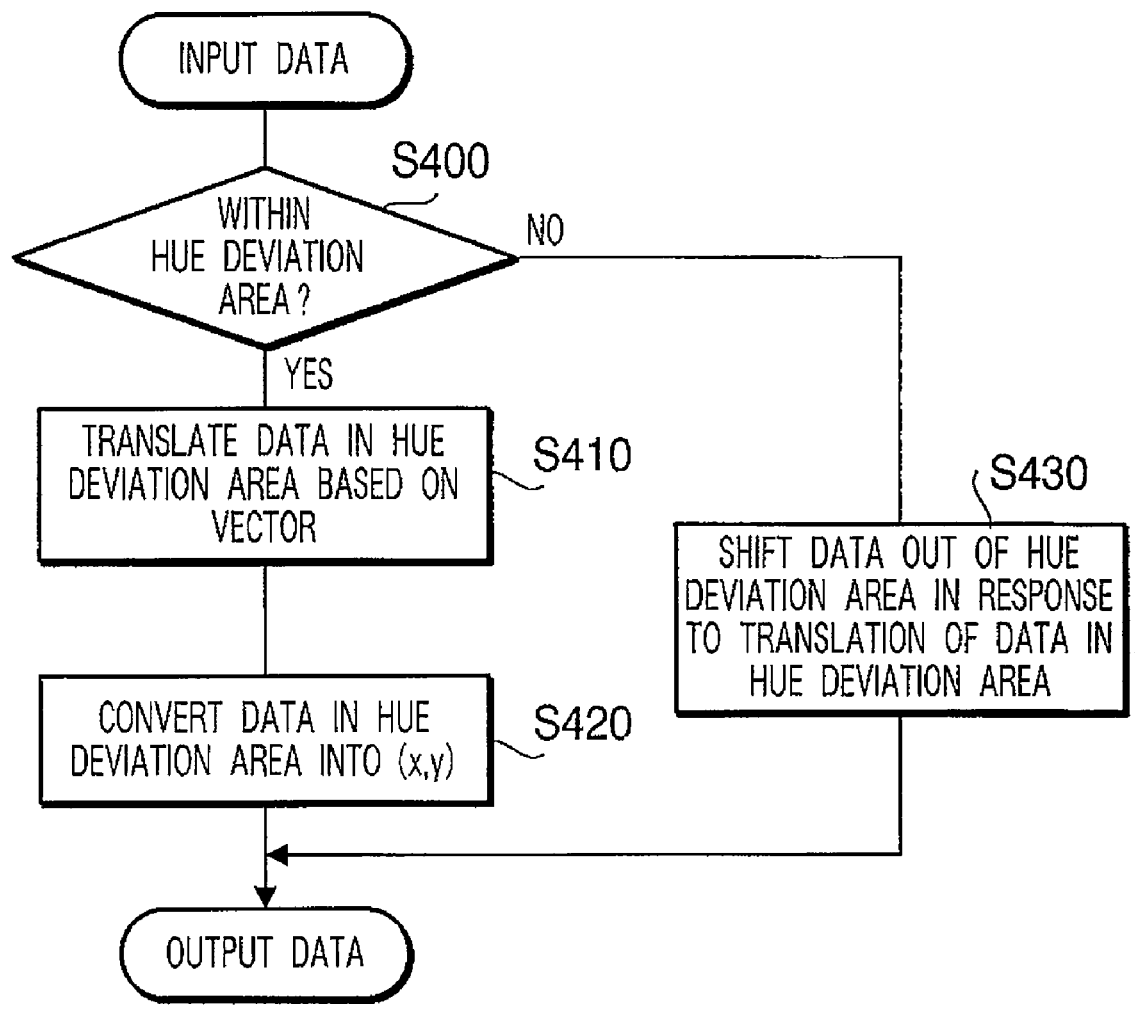

FIG. 13 is a flowchart showing a color converting process for a hue deviation area to be executed by the color space converting unit in a second embodiment in accordance with one or more aspects of the present invention.

Figure 14:
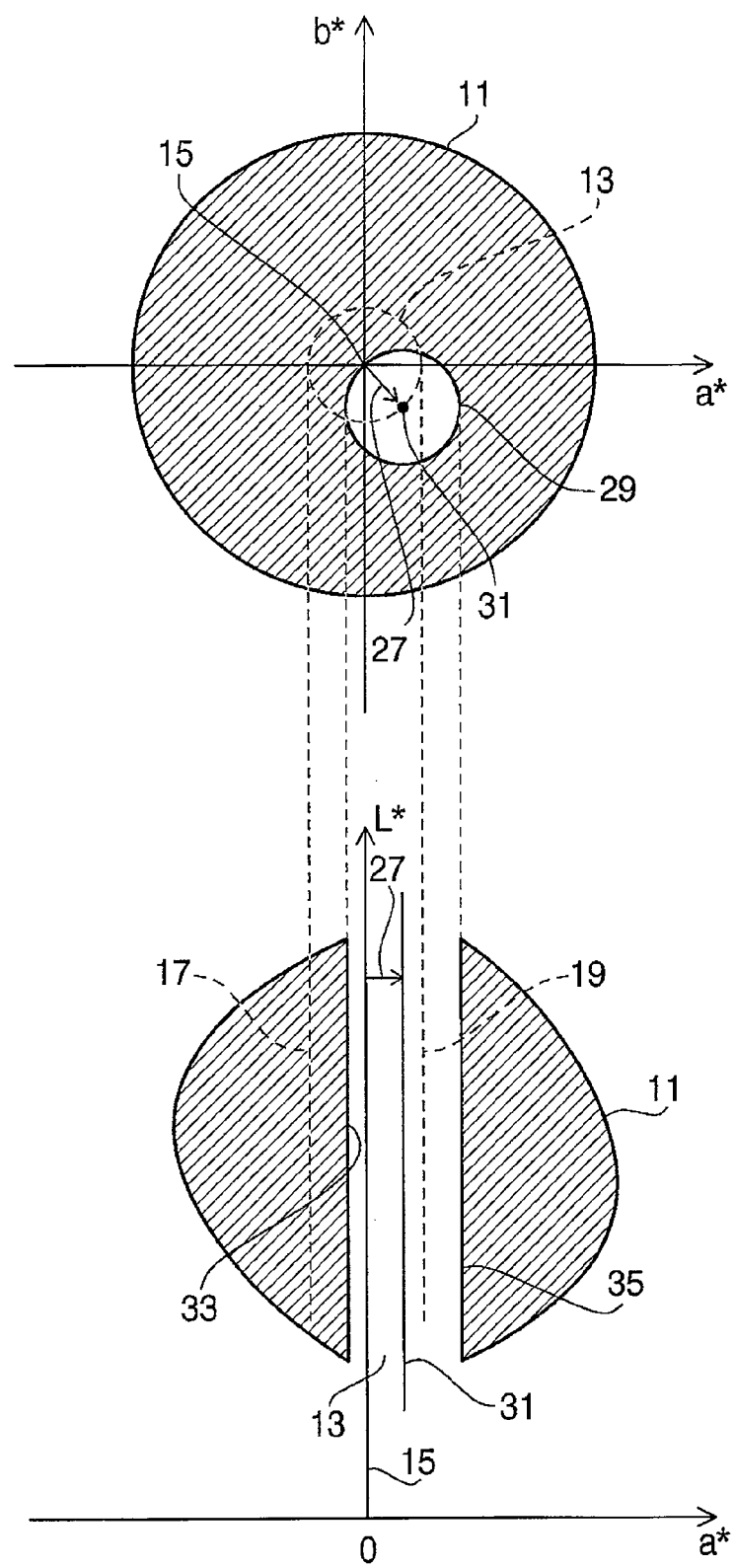

FIG. 14 is an illustration for explaining the color converting process for the hue deviation area in the second embodiment in accordance with one or more aspects of the present invention.

Figure 15:
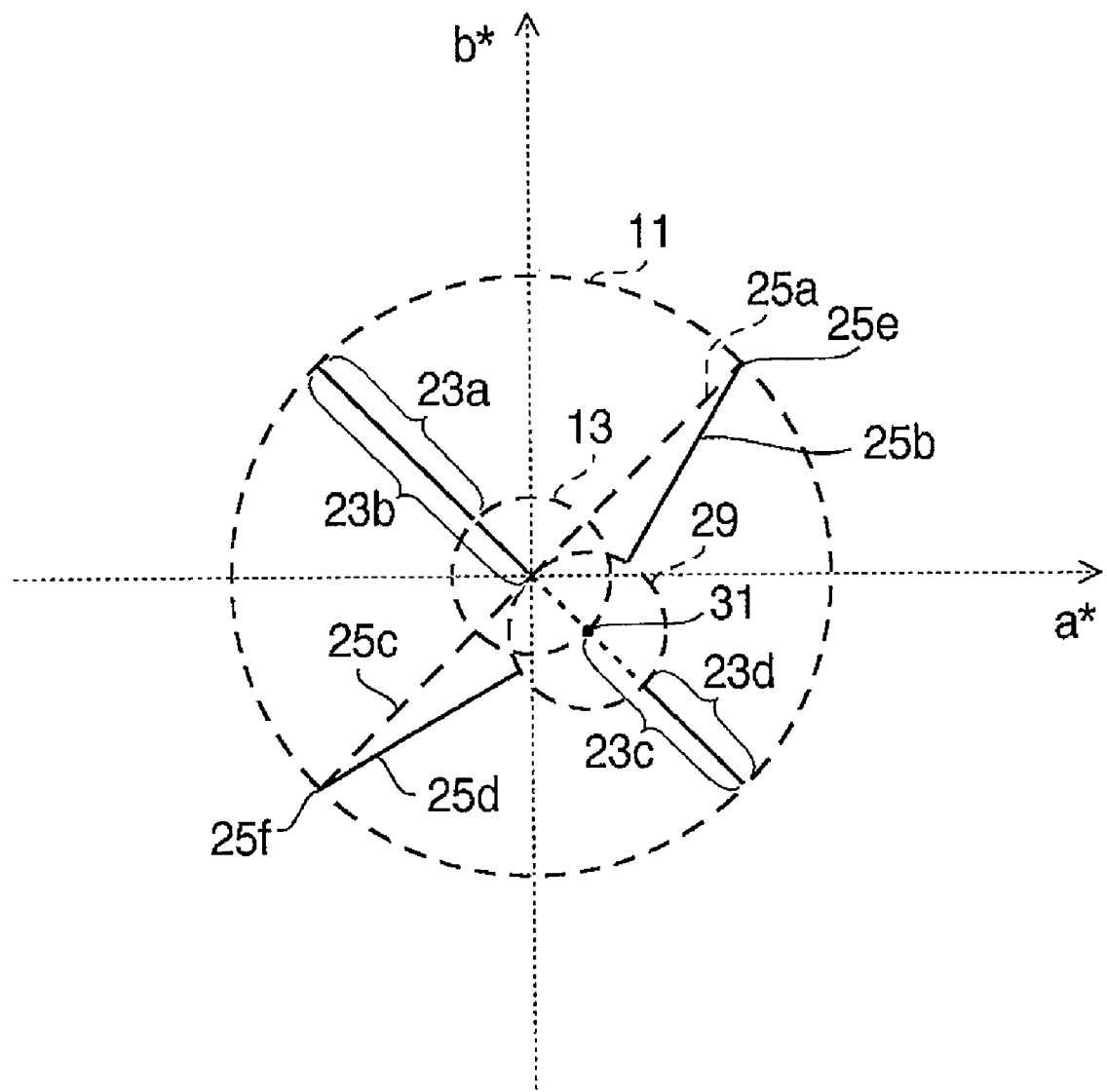

FIG. 15 schematically shows the input color image data after a gray stabilization process has been performed therefor in the second embodiment in accordance with one or more aspects of the present invention.

Figure 16:
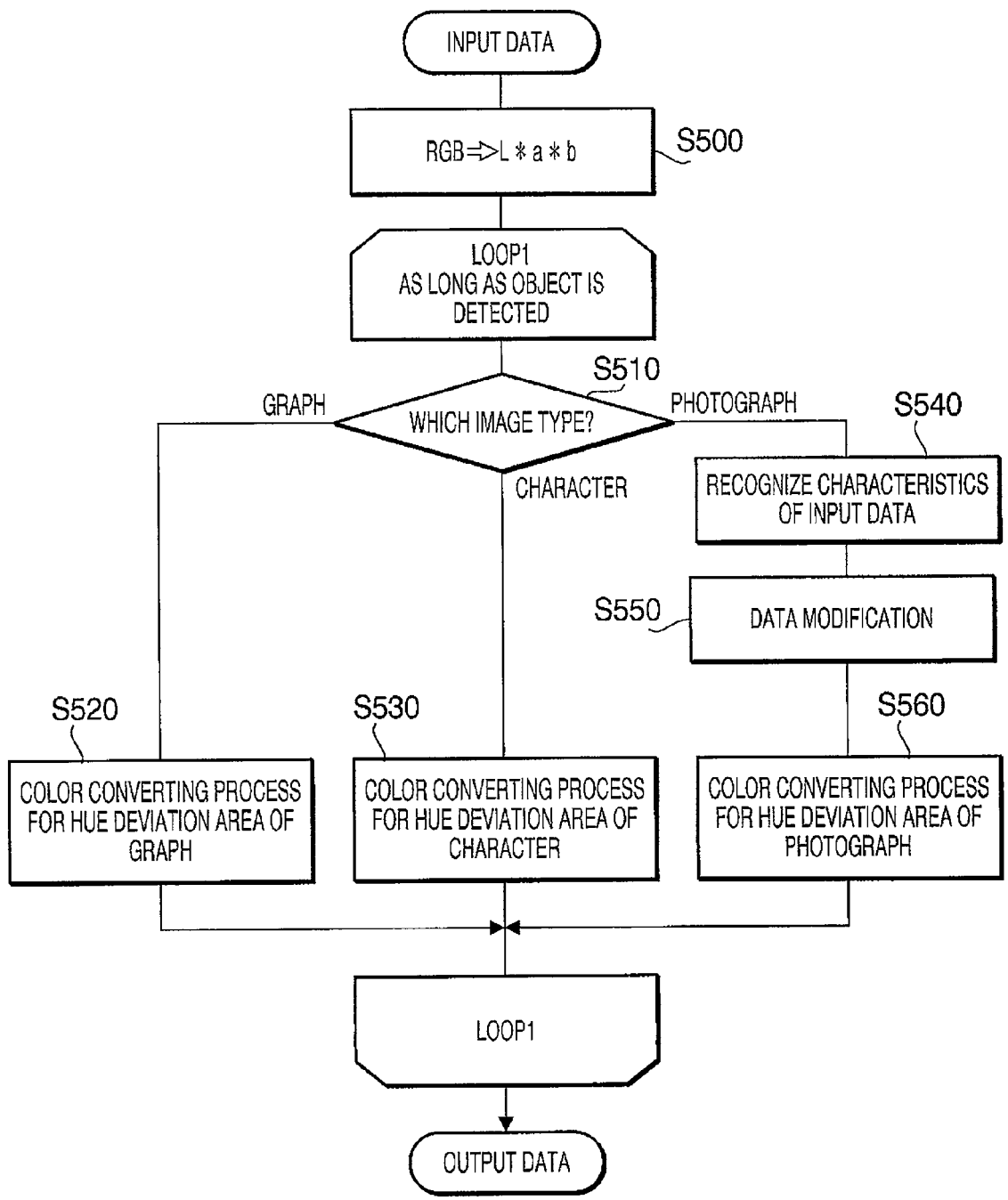

FIG. 16 is a flowchart showing a color converting process for a hue deviation area to be executed by the color space converting unit in a third embodiment in accordance with one or more aspects of the present invention.

Figure 17:
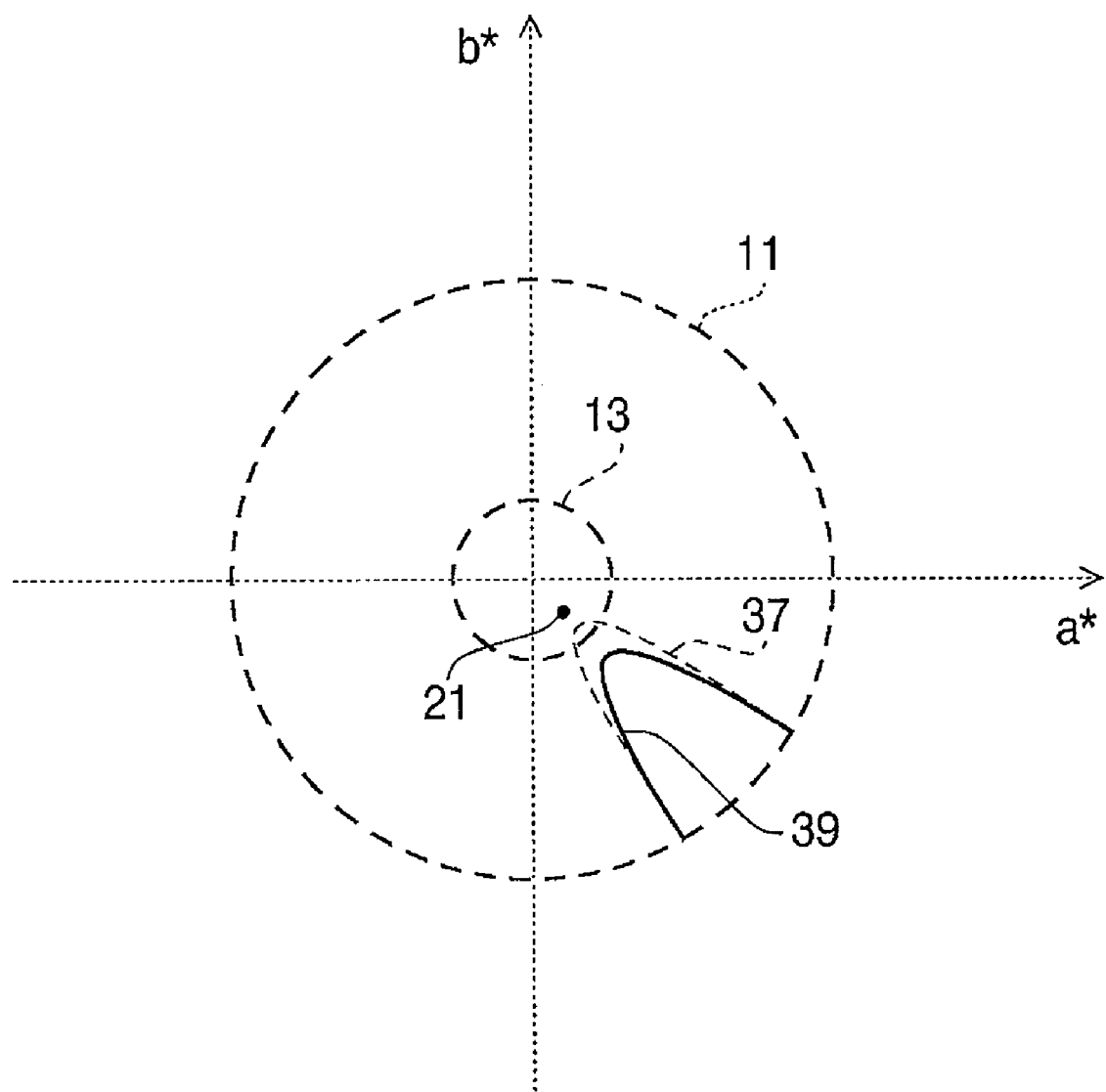

FIG. 17 is an illustration for explaining an operation of modifying a gradation portion so as not to be included in a hue deviation area in the third embodiment in accordance with one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided a color image processing device configured to process input color image data, which includes a specifying unit configured to specify a gray region including a gray axis within a color gamut of the input color image data in a color space, a first setting unit configured to set a first gray stabilization region away from the gray axis in the color space so as to satisfy a predetermined condition, and a first transferring unit configured to transfer each color within the gray region specified by the specifying unit into the first gray stabilization region.

According to some aspects, the first gray stabilization region is set away from the gray axis in accordance with the predetermined condition, and each color within the gray region including the gray axis is transferred into the first gray stabilization region. Namely, colors in the vicinity of the gray axis, around which the hue deviation of a color that could be caused by image formation is likely to be noticeable, is transferred into a region (the gray stabilization region) away from the gray axis. Therefore, it is possible to make the hue deviation of a gray color less noticeable in an actually formed color image. It is noted that the gray axis is, for example, an axis that satisfies a condition of $a^*=0$ and $b^*=0$ in an $L^*a^*b$ color space, or an axis that satisfies a condition of $R=G=B$ in an RGB color space.

Optionally, the predetermined condition may include a condition where an axis along the gray axis, substantially regarded as a center axis of the first gray stabilization region, is away from the gray axis in the color space by more than a maximum hue deviation of colors within the color gamut of the input image data that could be caused by image formation.

According to some aspects, the first gray stabilization region is set such that the center axis thereof is away from the gray axis in the color space by more than a maximum hue deviation of colors within the color gamut of the input image data that could be caused by image formation. Thereby, it is possible to make the hue deviation of the gray color further less noticeable in the actually formed color image.

Optionally, the predetermined condition may include a condition where an axis along the gray axis that can substantially be regarded as a center axis of the first gray stabilization region is away from the gray axis in the color space along a vector of about 6 in a B (Black) direction, about 5 in a C (Cyan) direction, about 3 in an R (Red) direction, about 3 in a Y (Yellow) direction, 0 in a G (Green) direction, and 0 in an M (Magenta) direction.

According to some aspects, the first gray stabilization region is set such that the center axis thereof is away from the gray axis in the color space along the vector of about 6 in a B (Black) direction, about 5 in a C (Cyan) direction, about 3 in an R (Red) direction, about 3 in a Y (Yellow) direction, 0 in a G (Green) direction, and 0 in an M (Magenta) direction. Thus, by setting the first gray stabilization region based on the above condition derived as a result of sensory evaluation, it is possible to make the hue deviation of the gray color that could be caused by the image formation further less noticeable.

Optionally, the color image processing device may further include a second setting unit configured to set a second gray stabilization region smaller than the first gray stabilization region within the first gray stabilization region, and a second transferring unit configured to transfer each color within the first gray stabilization region into the second gray stabilization region.

According to some aspects, the second gray stabilization region smaller than the first gray stabilization region is set within the first gray stabilization region, and then each color within the first gray stabilization region is transferred into the second gray stabilization region. Namely, each color within the gray region is transferred into the second gray stabilization region smaller than the first gray stabilization region. Hence, it is possible to make the hue deviation of the gray color that could be caused by the image formation further less noticeable.

Optionally, the color image processing device may further include a modification unit configured to perform hue modification for each color out of the gray region within the color gamut of the input color image data in response to each color within the gray region being transferred into the first gray stabilization region by the first transferring unit.

According to some aspects, when each color within the gray region is transferred into the first gray stabilization region, hue modification is also performed for each color out of the gray region. Therefore, it is possible to avoid emergence of unnatural gradation in the actually formed color image.

Optionally, the first transferring unit may be configured to convert each color of a luminance within the gray region into a color of the same luminance within the first gray stabilization region.

Still optionally, the first gray stabilization region may include a single color for each luminance. In this case, the first transferring unit may be configured to convert all colors of a luminance within the gray region into a single color of the same luminance included in the first gray stabilization region.

According to some aspects, all colors of a luminance within the gray region are converted a single color of the same luminance that is sufficiently away from the gray axis. Thereby, it is possible to make the hue deviation of the gray color that could be caused by the image formation further less noticeable. In some aspects, the first gray stabilization region can be defined, for example, as an axis parallel to the gray axis.

Optionally, the second transferring unit may be configured to convert each color of a luminance within the first gray stabilization region into a color of the luminance within the second gray stabilization region.

Yet optionally, the second gray stabilization region may include a single color for each luminance. In this case, the second transferring unit may be configured to convert all colors of a luminance within the first gray stabilization region into a single color of the luminance included in the second gray stabilization region.

According to some aspects, all colors of a luminance within the first gray stabilization region are converted a single color of the same luminance included in the second gray stabilization region. Thereby, it is possible to make the hue deviation of the gray color that could be caused by the image formation farther less noticeable. In some aspects, the second gray stabilization region can be defined, for example, as an axis parallel to the gray axis.

Optionally, the specifying unit may be configured to specify the gray region depending on a type of the input color image data.

In some aspects, for example, when the input color image data are data of a character type, the gray region is set to be of the largest size. Meanwhile when the input color image data are data of a graph type, the gray region is set to be of a medium size. Further, when the input color image data are data of a photograph type, the gray region is set to be of the smallest size. In this case, even though the input color image data are for a photograph image, it is possible to avoid emergence of unnatural gradation in the actually formed color image.

Optionally, the specifying unit may be configured to specify the gray region depending on at least one of a range of the color gamut and a data distribution of the input color image data.

According to some aspects, the gray region can be specified in view of characteristics of the input color image data such as a range of the color gamut and a data distribution of the input color image data. Thereby, it is possible to avoid emergence of unnatural gradation in the actually formed color image.

In some aspects, for example, the gray region can be specified so as to be larger as the color gamut of the input color image data is larger. Further, the gray region can be specified so as to include a region of a high color data density that ranges around the gray axis.

Optionally, the color image processing device may further include a modifying unit configured to perform hue modification for colors forming gradation in the color gamut some of which are included in the gray region such that the colors forming the gradation are out of the gray region before the first transferring unit transfers each color within the gray region into the first gray stabilization region.

According to some aspects, hue modification is performed for the colors forming gradation in the color gamut some of which are included in the gray region such that the colors forming the gradation are out of the gray region. Thereby, it is possible to avoid emergence of unnatural gradation in the actually formed color image.

According to another aspect of the present invention, there is provided a computer usable medium having computer readable instructions stored thereon, which, when executed by a computer, cause the computer to perform steps of specifying a gray region including a gray axis within a color gamut of the input color image data in a color space, setting a first gray stabilization region away from the gray axis in the color space so as to satisfy a predetermined condition, and transferring each color within the gray region as specified into the first gray stabilization region.

When there are executed by a computer the instructions stored on the computer usable medium configured as above, the same effects as the aforementioned can be expected.

Illustrative Aspects

Hereinafter, embodiments according to aspects of the present invention will be described with reference to the accompanying drawings.

First Embodiment a) Configuration of Image Processing Device 1 and Basic Conversion Process to be Executed by Image Processing Device 1

Figure 1:
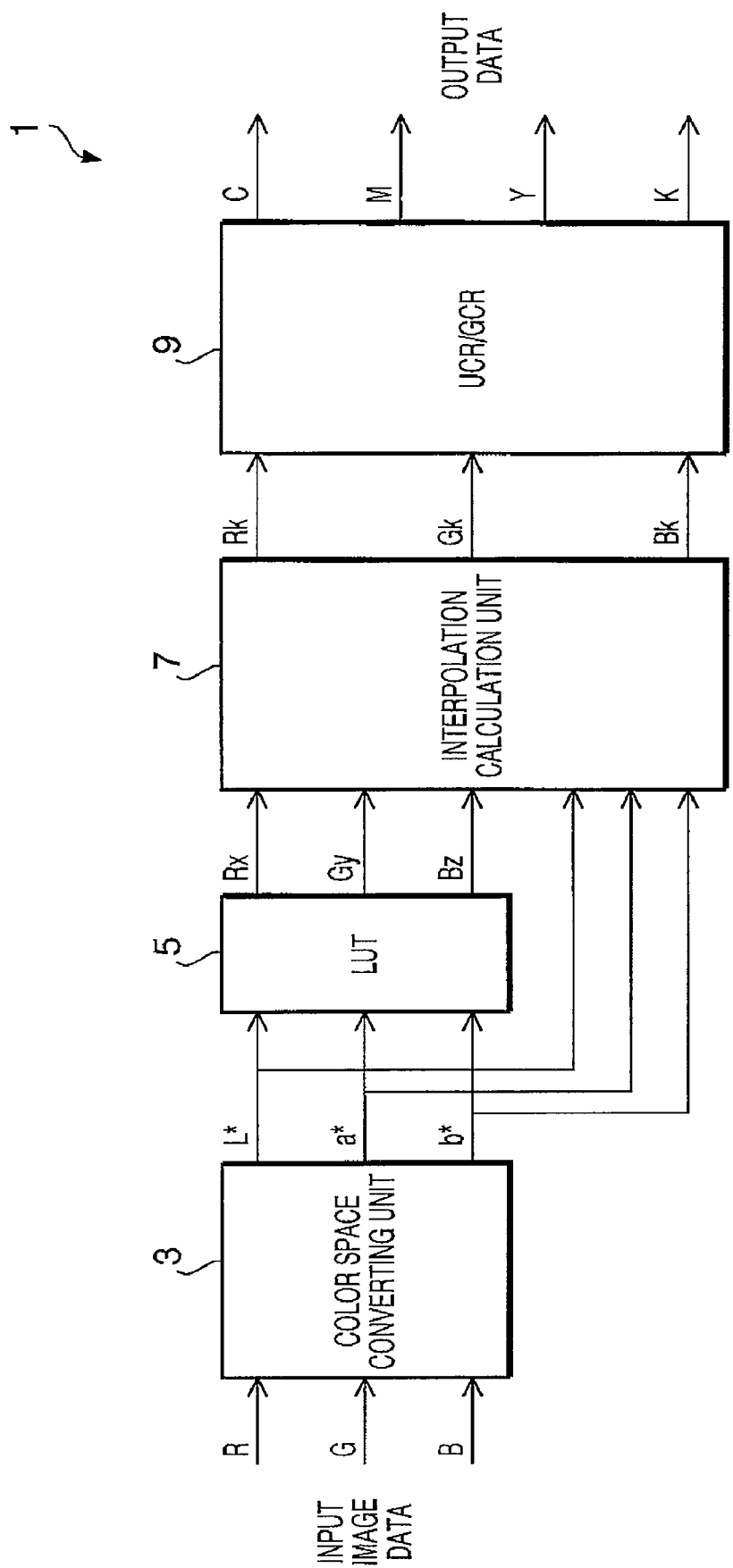

FIG. 1 is a functional block diagram of an image processing device 1 according to aspects of the present invention. The image processing device 1 is a device that converts input image data (input color image data or input monochrome image data) such that a color gamut thereof conforms to a color gamut of an image output device (not shown) such as an inkjet printer. The image processing device 1 is provided with a color space converting unit 3, look-up table (LUT) 5, interpolation calculation unit 7, and UCR/GCR unit 9. In addition, a function of each of the aforementioned units is attained by a normal control unit (not shown) provided with a CPU, RAM, ROM, etc. and a program stored in the ROM.

The color space converting unit 3 converts the input color image data represented in a RGB color space into image data represented in an L*a*b color space. At this time, when the input image data are not monochrome image data (namely, when the input image data are color image data), a gray stabilization process to be described later in detail is performed.

Figure 2:
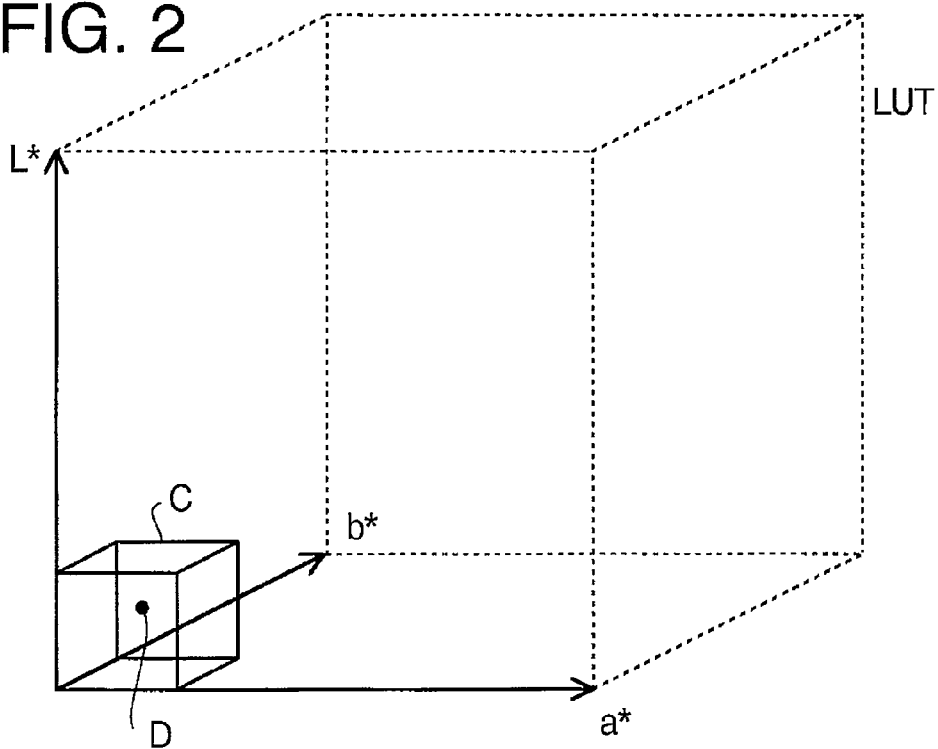
Figure 3:
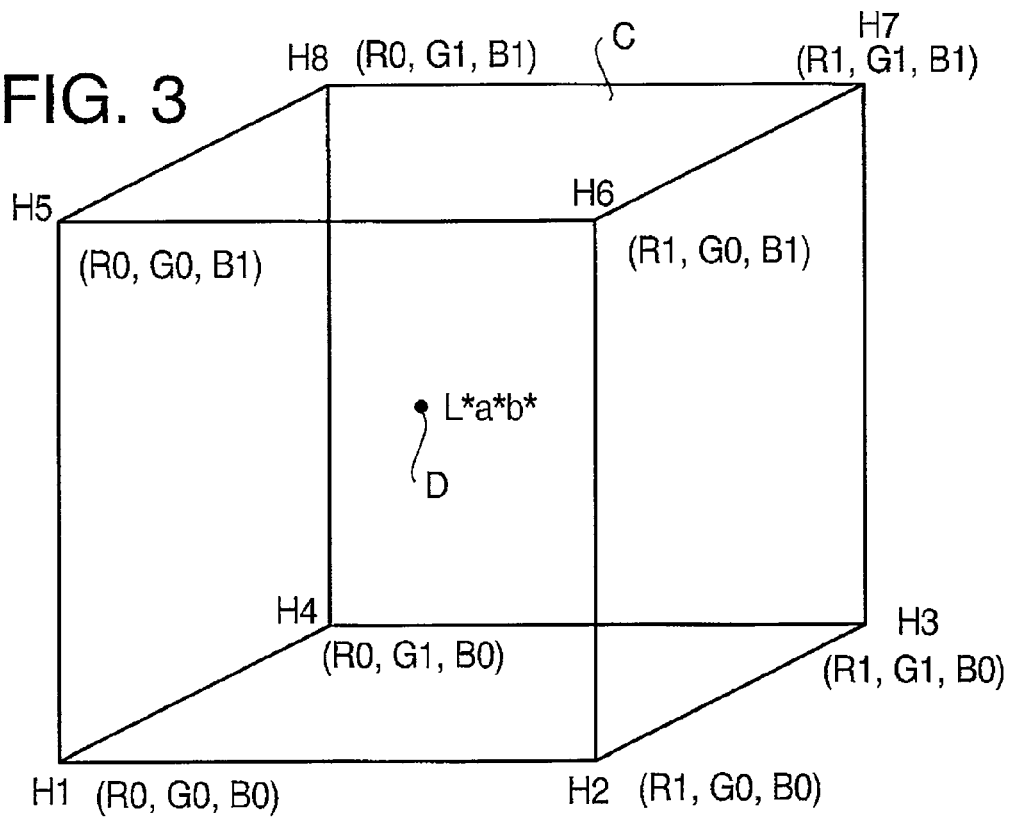

As shown in FIG. 2, the LUT 5 specifies a cube C that includes given data D of the input image data, when the L*a*b color space is sectionalized by a plurality of cubes of the same size. Then, as shown in FIG. 3, the LUT 5 refers to data H1 to H8 each of which represents coordinates of each lattice point of the cube C in the RGB color space. It is noted that the data H1 to H8 are color data obtained after converting the input color image data such that the color gamut thereof conforms to the color gamut of the image output device.

Figure 4:
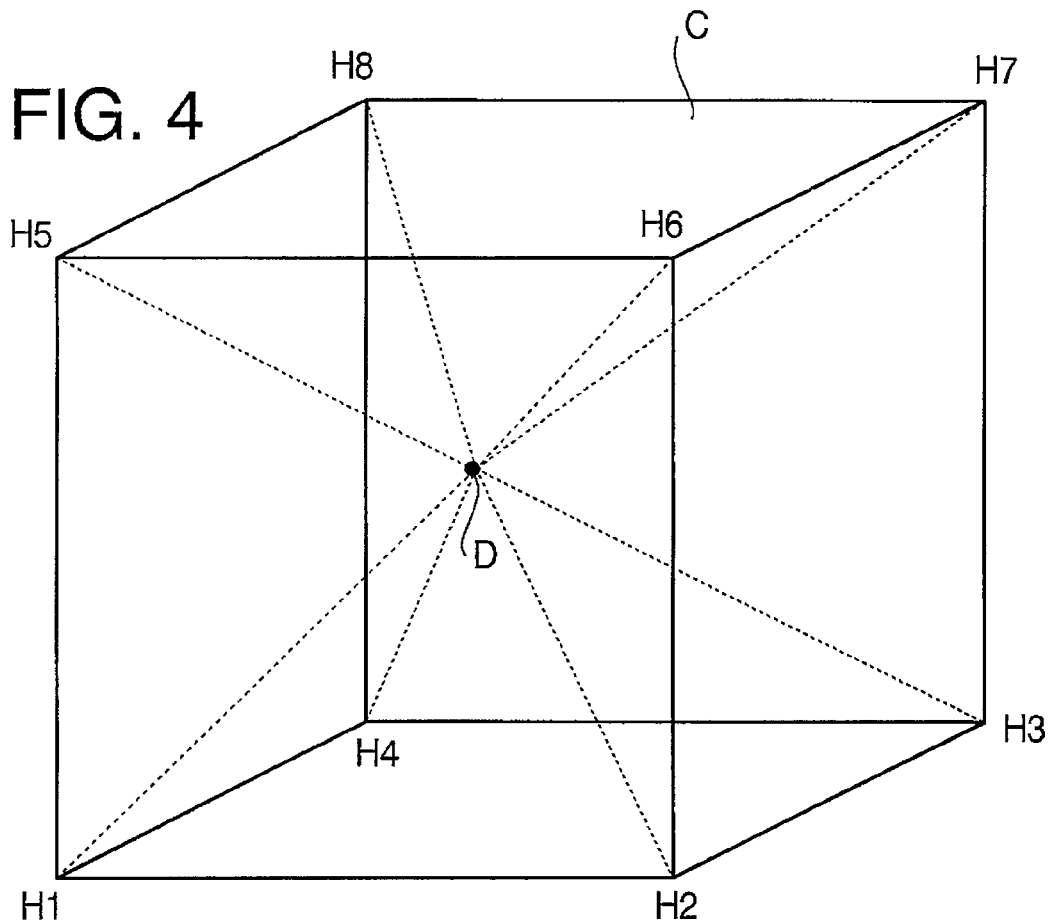

The aforementioned interpolation calculation unit 7 performs an interpolation calculation using the data H1 to H8, and converts the data D to conform them to the color gamut of the image output device. Specifically, as shown in FIG. 4, the interpolation calculation unit 7 performs the interpolation calculation by using a distance between the data D and each of the data H1 to H8 as a weight to conform the data D to the color gamut of the image output device. The converted image data are represented in the RGB color space.

The UCR/GCR unit 9 converts the image data represented in the RGB color space into image data represented in an CMYK color space.

b) Processes to Be Executed by Color Space Converting Unit 3

Figure 5:
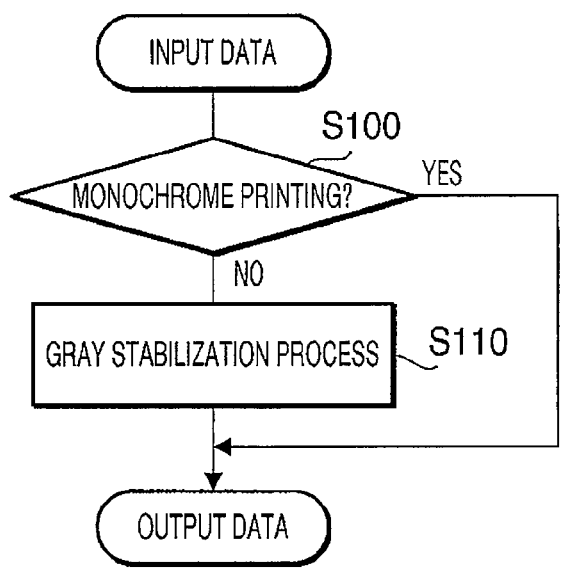
FIG. 5 is a flowchart showing a process to judge whether a gray stabilization process is to be executed by a color space converting unit in a first embodiment in accordance with one or more aspects of the present invention.
Figure 6:
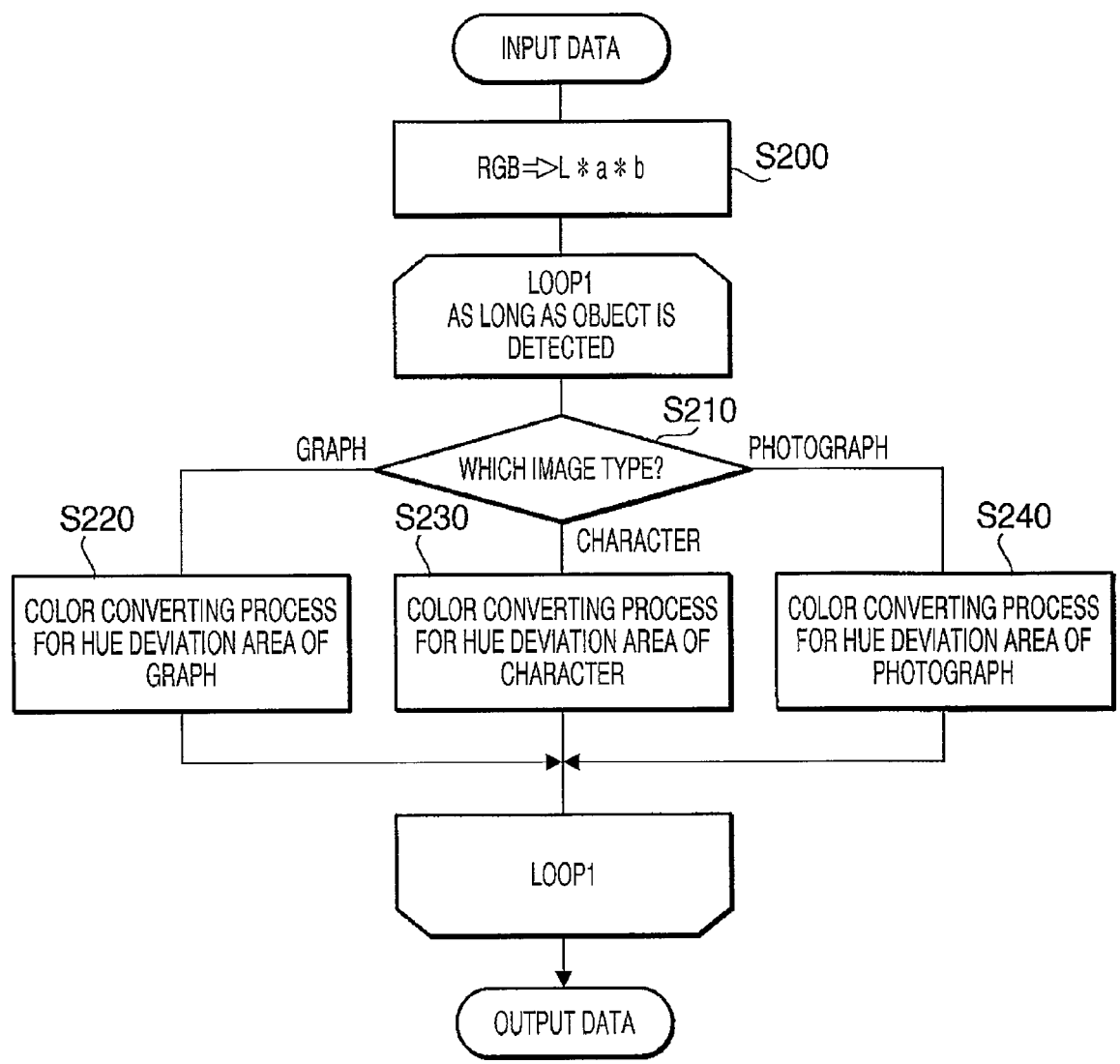
FIG. 6 is a flowchart showing the gray stabilization process to be executed by the color space converting unit in the first embodiment in accordance with one or more aspects of the present invention.
Figure 7:
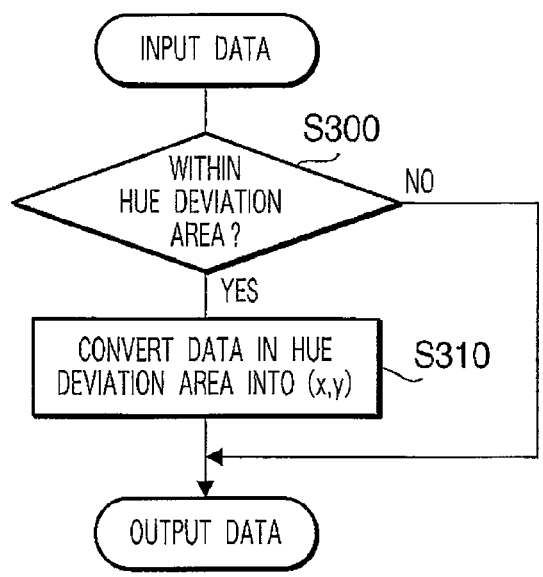
FIG. 7 is a flowchart showing a color converting process for a hue deviation area to be executed by the color space converting unit in the first embodiment in accordance with one or more aspects of the present invention.

Next, processes to be executed by the color space converting unit 3 will be described in detail based on flowcharts shown in FIGS. 5 to 7.

Firstly, a process to judge whether to perform the gray stabilization process will be explained based on a flowchart shown in FIG. 5. It is judged whether input image data are monochrome image data in a step S100. When it is not judged that the input image data are monochrome image data, the process proceeds to a step S110. Meanwhile, when it is judged that the image data are monochrome image data, the process is terminated (the input image data is merely converted into image data represented in the L*a*b color space, and the gray stabilization process is not performed for the input image data).

In the step S110, the gray stabilization process is executed. Subsequently, the gray stabilization process will be explained with reference to a flowchart shown in FIG. 6. In a step S200, the input color image data represented in the RGB color space are converted into the input color image data represented in the L*a*b color space.

In a step S210, it is judged which type of data the input color image data are among graph data, character data, and photograph data. When it is judged that the input color image data are the graph data, the process goes to a step S220. Meanwhile, when it is judged that the input color image data are the character data, the process goes to a step S230. Further, when it is judged that the input color image data are the photograph data, the process goes to a step S240.

In the step S220, a color converting process for a hue deviation area of the graph data is executed. In the step S230, a color converting process for the hue deviation area of the character data is executed. In the step S240, a color converting process for the hue deviation area of the photograph data is executed.

It is noted that an operation of the steps S210 to S240 is repeatedly performed every time an object is detected. Next, the color converting process for the hue deviation area of the graph data will be explained with reference to a flowchart shown in FIG. 7.

Figure 8:
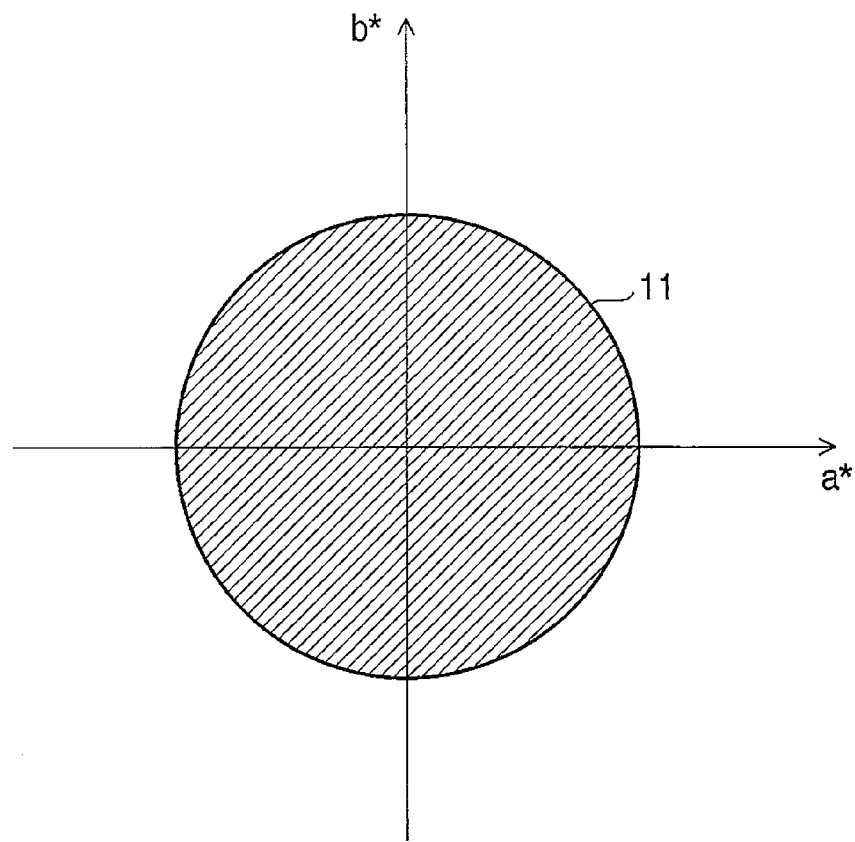
FIG. 8 shows input color image data represented in the L*a*b color space before the color converting process for the hue deviation area in the first embodiment in accordance with one or more aspects of the present invention.
Figure 9:
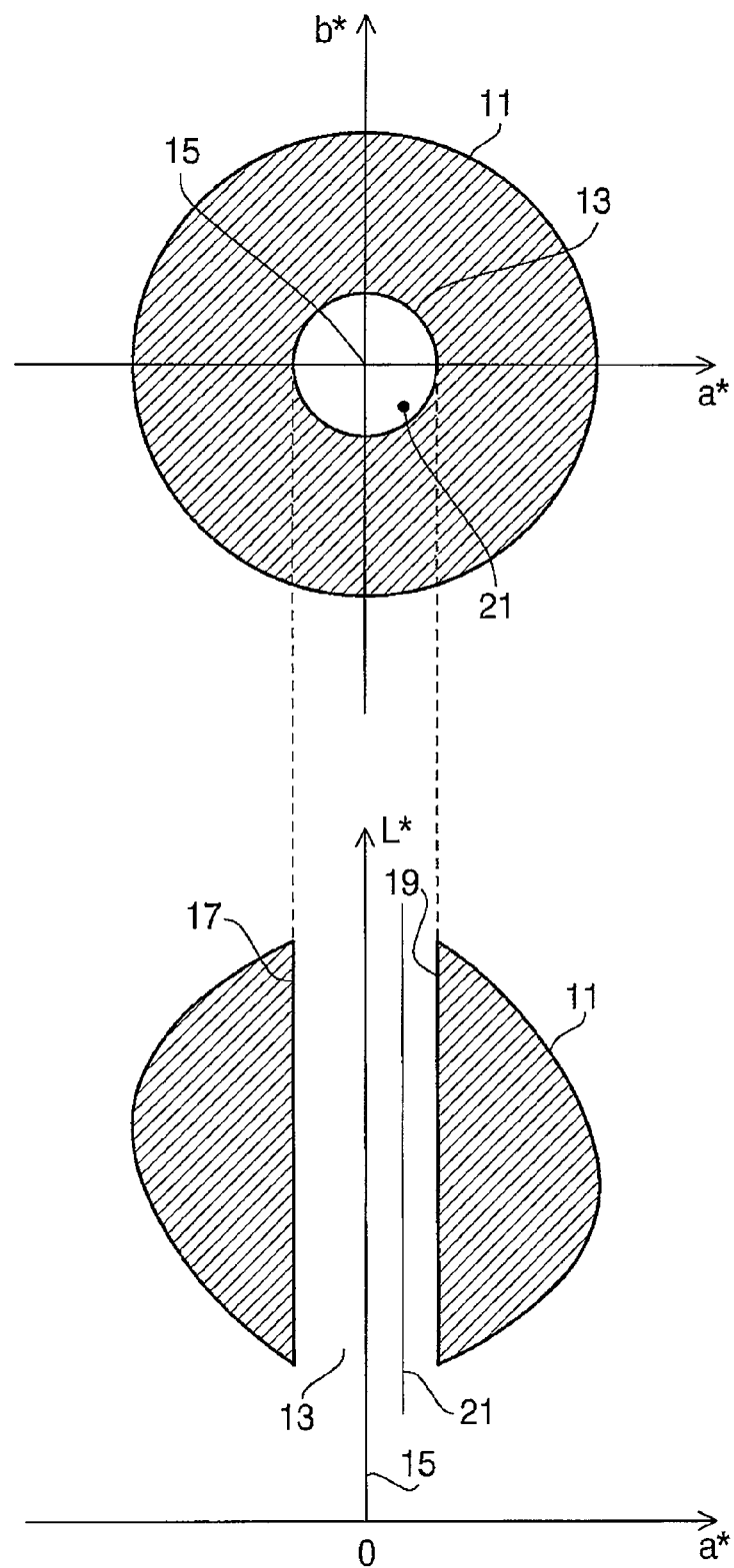
FIGS. 9 and 10 are illustrations for explaining the color converting process for the hue deviation area in the first embodiment in accordance with one or more aspects of the present invention.
Figure 10:
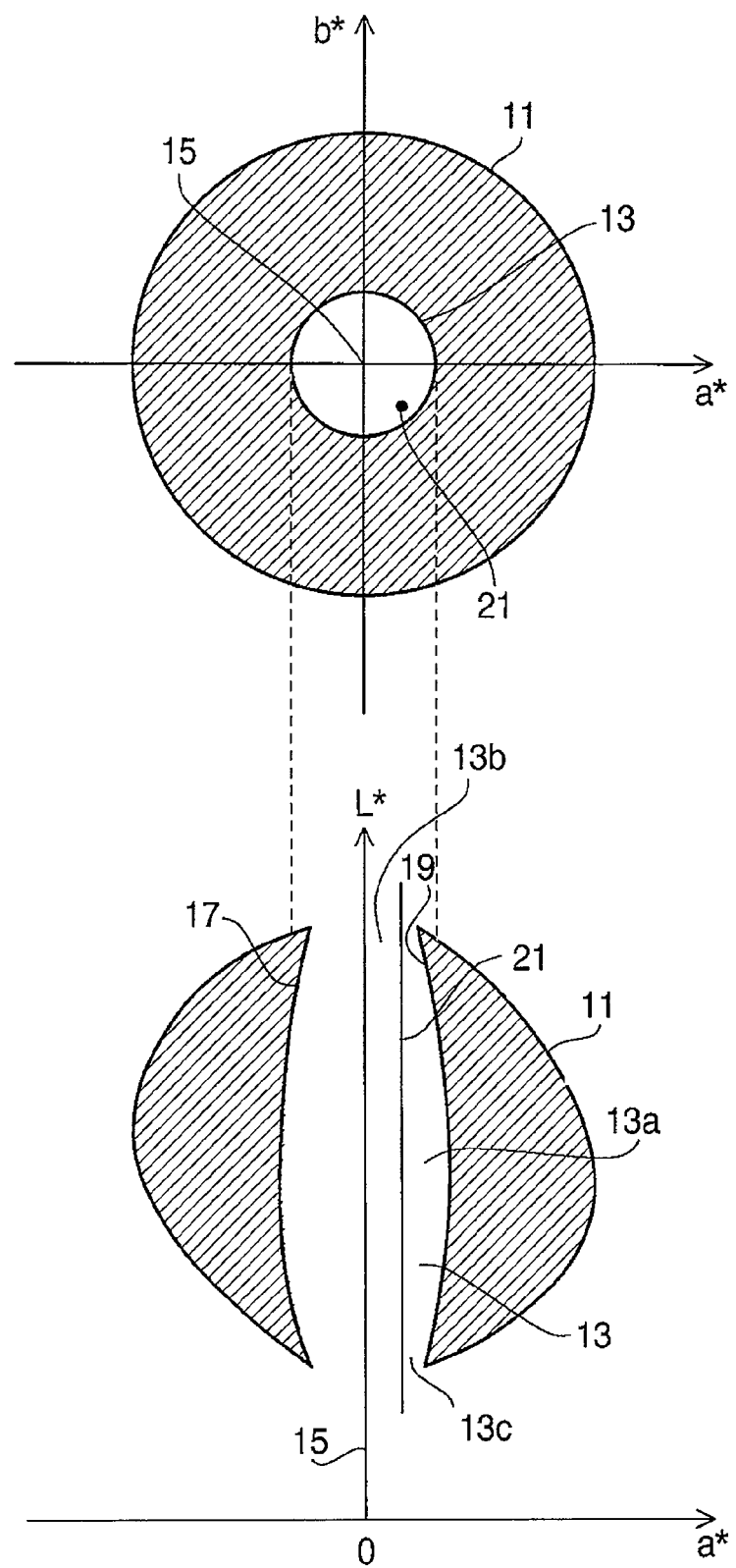

In a step S300, it is judged whether a target color is within the hue deviation area set by the color space converting unit 3. Here, the hue deviation area will be explained with reference to FIGS. 8 and 9. FIG. 8 shows input color image data represented in the L*a*b color space before the color converting process for the hue deviation area. In FIG. 8, a shaded area represents an input color gamut 11. As shown in FIG. 9, a hue deviation area 13 is a region ranging around a gray axis (a*=0, b*=0) 15 that has a circular cross section along an a*b* plane. When each color in the input color gamut 11 deviates from an original color represented by the color image data after an image forming operation, the hue deviation of a color closer to the gray axis 15 tends to be more noticeable in the actually formed color image. Further, in general, frequency of color data (color data density) is higher in the vicinity of the gray axis 15. Hence, when a region of a high color data density that ranges around the gray axis 15 is specified as the hue deviation area 13 in view of a size of the color gamut 11 as shown in FIG. 9, the below-mentioned gray stabilization process for the hue deviation area 13 can make the hue deviation less noticeable in the actually formed color image. In addition, a cross section of the hue deviation area 13 that includes the gray axis 15 is sandwiched between border lines 17 and 19 each of which has a predetermined shape. As shown in FIG. 9, the cross section of the hue deviation area 13 that includes the gray axis 15 may be sandwiched between the border lines 17 and 19 parallel to the gray axis 15. Further, as shown in FIG. 10, the cross section of the hue deviation area 13 that includes the gray axis 15 may be wider at a center portion 13a thereof, and may be narrower at an upper portion 13b and a lower portion 13c. It is noted that, in the hue deviation area 13 shown in FIG. 10, since the upper portion 13b is a region of high luminance where the color is bright and the hue deviation is not so noticeable, the hue deviation area 13 can be made narrower at the upper portion 13b. Additionally, at the lower portion 13c, the color is dark, and a ratio of "K (black)" increases while ratios of "CMK (Cyan, Magenta, and Yellow)" decrease in the process of the UCR/GCR 9. Therefore, since the hue deviation is not so noticeable at the lower portion 13c, the lower portion 13c can be made narrower.

When it is judged in the step S300 that the target color of the input color image data is within the hue deviation area 13 set by the color space converting unit 3 (S300: Yes), the process goes to a step S310. Meanwhile, when it is not judged that the target color is within the hue deviation area 13 (S300: No), the process is terminated.

In the step 310, colors in the hue deviation area 13 are converted into a color on a gray stabilization axis 21. As shown in FIG. 9, the gray stabilization axis 21 is a straight line parallel to the gray axis 15, which satisfies a condition where a*=x, and b*=y in the L*a*b color space. Therefore, in the step S310, all colors in the hue deviation area 13 are converted into a single color represented by the condition where a*=x, and b*=y. The gray stabilization axis 21 is set away from the gray axis 15 by more than the maximum hue deviation that could be caused by the image forming operation. Preferably, the gray stabilization axis 21 may be set away from the gray axis 15 in the a*b* plane along a vector defined by a condition of about 6 in a B (Black) direction, about 5 in a C (Cyan) direction, about 3 in an R (Red) direction, about 3 in a Y (Yellow) direction, 0 in a G (Green) direction, and 0 in an M (Magenta) direction. The above condition is determined from sensory evaluation as a location at which the hue deviation that could be caused by the image forming operation is the least noticeable in the actually formed color image. It is noted that the luminance is not changed by the conversion. Further, the process shown in FIG. 7 is executed for all colors included in the input color image data.

The color converting process for the hue deviation area of the character data and the color converting process for the hue deviation area of the photograph data are basically the same as the aforementioned color converting process for the hue deviation area of the graph data. In this regard, however, the hue deviation area 13 for the character data is set larger in the a*b* plane than the hue deviation area 13 for the graph data. In addition, the hue deviation area 13 for the photograph data is set larger in the a*b* plane than the hue deviation area 13 for the graph data.

In other words, the hue deviation area 13 for the character data is, in the same manner as the graph data, a region including the gray axis (a*=0, b*=0) 15 that has a circular cross section along the a*b* plane of a larger diameter than that for the graph data.

Further, the hue deviation area 13 for the photograph data is, in the same manner as the graph data, a region including the gray axis (a*=0, b*=0) 15 that has a circular cross section along the a*b* plane of a smaller diameter than that for the graph data.

c) Input Color Image Data after Gray Stabilization Process

Subsequently, there will be explained with reference to FIGS. 11 and 12 how the input color image data are changed by the gray stabilization process. FIG. 11 shows the input color image data before the gray stabilization process is performed therefor. The input color gamut 11 includes gradation portions 23 and 25 each of which provides a gradual and progressive change from one color to another.

FIG. 12 shows the input color image data after the gray stabilization process has been performed therefor. As described above, all of the colors in the hue deviation area 13 are converted into the color on the gray stabilization axis 21. Accordingly, some colors of the gradation portions 23 and 25 that are included in the hue deviation area 13 are converted into the color on the gray stabilization axis 21. Meanwhile, the other colors of the gradation portions 23 and 25 that are not included in the hue deviation area 13 are the same as those before the gray stabilization process.

Second Embodiment

A configuration and an operation of an image processing device 1 in a second embodiment are similar to those in the aforementioned first embodiment. However, the image processing device 1 in the first embodiment is different in the color converting process for the hue deviation area from the image processing device 1 in the second embodiment. Hereinafter, the difference between both of the image processing device 1 of the first embodiment and the image processing device 1 of the second embodiment will mainly be described. Further, explanation on the same portions as the first embodiment in the second embodiment will be omitted or simplified.

A color converting process for a hue deviation area in the second embodiment will be explained with reference to a flowchart shown in FIG. 13. It is noted that the following process is common to all types of input color image data such as the graph data, character data, and photograph data.

In a step S400, it is judged whether an target color of input color image data is within a hue deviation area 13 set by the color space converting unit 3. Here, the hue deviation area 13 will be explained with reference to FIG. 14, which shows the input color image data represented in the L*a*b color space. A shaded portion represents an input color gamut 11 of the input color image data in FIG. 14. The hue deviation area 13 is a region ranging around the gray axis (a*=0, b*=0) 15 as a center axis thereof. The hue deviation area 13 has a circular cross section along the a*b* plane. In addition, a cross section of the hue deviation area 13 that includes the gray axis 15 is sandwiched between border lines 17 and 19 each of which has a predetermined shape. As shown in FIG. 9, the cross section of the hue deviation area 13 that includes the gray axis 15 may be sandwiched between the border lines 17 and 19 parallel to the gray axis 15. Further, as shown in FIG. 10, the cross section of the hue deviation area 13 that includes the gray axis 15 may be wider at a center portion 13a thereof, and may be narrower at an upper portion 13b and a lower portion 13c.

In the step S400, when it is judged that the target color of the input color image data is within the hue deviation area 13 (S400: Yes), the process proceeds to a step S410. Meanwhile, when it is not judged that the target color of the input color image data is within the hue deviation area 13 (S400: No), the process goes to a step S430. In the step 410, colors in the hue deviation area 13 are translated according to a vector 27 (in a direction of the vector 27 by a length of the vector 27) in the a*b* color space. In the aforementioned translation, the gray axis 15 located in the center of the hue deviation area 13 is shifted to an axis of a*=x, and b*=y. Namely, in the step S410, the data in the hue deviation area 13 are translated to data in a region 29 ranging around the axis of a*=x, and b*=y as a center axis thereof. As shown in FIG. 14, the region 29 is a region that has a gray stabilization axis (a*=x, b*=y) 13, parallel to the gray axis 15, as a center axis thereof. The region 29 has a circular cross section along the a*b* plane that has the gray stabilization axis 31 as the center thereof. In addition, a cross section of the region 29 that includes the gray stabilization axis 13 is sandwiched between border lines 33 and 35 each of which has a predetermined shape. As described above, the region 29 is defined as a region to which the hue deviation area 13 is translated along the vector 27. Therefore, the region 29 has the same shape as the hue deviation area 13. It is noted that the vector 27 has a length larger than the maximum hue deviation that could be caused by the image forming operation. Preferably, the vector 27 may be defined by the condition, determined from the sensory evaluation, of about 6 in the B direction, about 5 in the C direction, about 3 in the R direction, about 3 in the Y direction, 0 in the G direction, and 0 in the M direction. Since the region 29 is kept a sufficient distance away from the gray axis 15, the aforementioned translation of the hue deviation area 13 can make the hue deviation less noticeable in the formed color image. Thus, the only translation of the hue deviation area 13 can bring the same effect as the first embodiment. However, in the second embodiment, the below-mentioned gray stabilization process is further performed.

In the step 420, the colors translated in the step S410 are converted into a color of the gray stabilization axis 31. Consequently, in the steps S410 and S420, the colors in the hue deviation area 13 are converted into the single color of a*=x, and b*=y. Additionally, a distance between the gray stabilization axis 31 and the gray axis 15 is set longer than the maximum hue deviation that could be caused by the image forming operation. It is noted that the luminance of each of the colors to be converted is kept the same in the aforementioned conversion.

In the meantime, when the judgment in the step S400 is negative (S400: No), the process goes to the step S430. In the step S430, data out of the hue deviation area 13 are shifted in response to the translation of the hue deviation area 13. The operation in the step S430 will be explained with reference to FIG. 15.

FIG. 15 shows how the colors are converted in the gray stabilization process. As described above, the data in the hue deviation area 13 are translated to the region 29, and then converted into the color on the gray stabilization axis 31. In the step S430, in response to the translation and conversion of the data in the hue deviation area 13, the data out of the hue deviation area 13 are shifted so as to prevent gradation in the converted color image data from being unnatural. Specifically, an upper left region out of the hue deviation area 13 in the input color gamut 11 in FIG. 15 is extended (namely, distance between any couple of data in the upper left region is broadened) in a lower right direction, in response to the data in the hue deviation area 13 being translated to the region 29. For example, a gradation portion 23a, extending in parallel with the a*b* plane from an outer border surface of the input color gamut 11 to a border surface of the hue deviation area 13, becomes a gradation portion 23b extending to a border surface of the region 29. At this time, some colors in the upper left region out of the hue deviation area 13 are shifted into the hue deviation area 13. However, as described above, the frequency of color data (i.e., color data density) is generally higher in the vicinity of the gray axis 15. It means that the color data density is not so high in the upper left region out of the hue deviation area 13, and that there are not so many colors shifted into the hue deviation area 13. Therefore, even though some colors in the upper left region out of the hue deviation area 13 are shifted into the hue deviation area 13, the hue deviation is hardly noticeable in the color image formed after this operation.

Further, a lower right region out of the hue deviation area 13 in the input color gamut 11 in FIG. 15 is compressed (namely, distance between any couple of data in the lower right region is shortened) in a lower right direction, in response to the data in the hue deviation area 13 being translated to the region 29. For example, a gradation portion 23c, extending in parallel with the a*b* plane from the outer border surface of the input color gamut 11 to the border surface of the hue deviation area 13, becomes a gradation portion 23d extending to a border surface of the region 29.

Further, for example, a gradation portion 25a, extending in parallel with the a*b* plane from the outer border surface of the input color gamut 11 to the border surface of the hue deviation area 13, is rotated counterclockwise around an intersection 25e thereof with the outer border surface of the input color gamut 11 so as to become a gradation portion 25b. Meanwhile, a gradation portion 25c, extending in parallel with the a*b* plane from the outer border surface of the input color gamut 11 to the border surface of the hue deviation area 13, is rotated clockwise around an intersection 25f thereof with the outer border surface of the input color gamut 11 so as to become a gradation portion 25d.

Third Embodiment

A configuration and an operation of an image processing device 1 of a third embodiment are basically the same as those in the first embodiment, and yet different in a gray stabilization process from those in the first embodiment. The difference will mainly be described hereinafter. It is noted that explanation on the same portions as the first embodiment in the third embodiment will be omitted or simplified.

A gray stabilization process of the third embodiment will be described with reference to a flowchart shown in FIG. 16. In a step S500, the input color image data represented in the RGB color space are converted into the input color image data represented in the L*a*b color space.

In a step S510, it is judged which type of data the input color image data are among the graph data, character data, and photograph data. When it is judged that the input color image data are the graph data, the process goes to a step S520. Meanwhile, when it is judged that the input color image data are the character data, the process goes to a step S530. Further, when it is judged that the input color image data are the photograph data, the process goes to a step S540.

In the step S520, the color converting process for the hue deviation area of the graph data is executed in the same manner as the first embodiment. In the step S530, the color converting process for the hue deviation area of the character data is executed in the same manner as the first embodiment.

In the step S540, the input color image data are mapped in the L*a*b color space or on the a*b* plane, and then a clustering operation is performed for the mapped data, so that characteristics of the input color image data can be recognized by pattern recognition. Specifically, as shown in FIG. 17, it is judged whether there is included in the hue deviation area 13 a part of a gradation portion 37.

In a step S550, when there is include in the hue deviation area 13 a part of the gradation portion 37, as shown in FIG. 17, the gradation portion 37 is modified to be a gradation portion 39 of which a part is not included in the hue deviation area 13. In a step S560, the color converting process for the hue deviation area of the photograph data is executed in the same manner as the first embodiment.

It is noted that the operation in the steps S510 to S560 is repeatedly performed every time an object is detected.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

For example, the shape of the cross section of the hue deviation area 13 along the a*b* plane is not limited to a circle, and it may be an arbitrary shape such as an oval, a polygon (e.g., a triangle, a pentagon, and a hexagon), and an area surrounded by a curved line.

In addition, the size of the hue deviation area 13 can be set depending on characteristics of the input image data (for example, a region of and/or colors used for the input color gamut 11). The characteristics of the input image data can be obtained by mapping the input image data in the L*a*b color space or on the a*b* plane, performing the clustering operation for the mapped data, and recognizing the data for which the clustering operation has been performed with the pattern recognition technique.

Additionally, instead of the gray stabilization axis 21 or 31, a gray stabilization region that has a predetermined volume in the L*a*b color space may be set.

What is claimed is:

1. A color image processing device configured to process input color image data, comprising:
    a specifying unit configured to specify a gray region including a gray axis within a color gamut of the input color image data in a color space;
    a first setting unit configured to set a first gray stabilization region away from the gray axis in the color space so as to satisfy a predetermined condition; and
    a first transferring unit configured to transfer each color within the gray region specified by the specifying unit into the first gray stabilization region,
    wherein the predetermined condition includes a condition where an axis along the gray axis, substantially regarded as a center axis of the first gray stabilization region, is away from the gray axis in the color space by more than a maximum hue deviation of colors within the color gamut of the input image data that could be caused by image formation.

2. The color image processing device according to claim 1, further comprising a modifying unit configured to perform hue modification for colors forming gradation in the color gamut some of which are included in the gray region such that the colors forming the gradation are out of the gray region before the first transferring unit transfers each color within the gray region into the first gray stabilization region.

3. The color image processing device according to claim 1,
    wherein the color space is L*a*b color space,
    wherein the gray axis satisfies a*=0 and b*=0 in the L*a*b color space,
    wherein the predetermined condition includes a condition where an axis along the gray axis, substantially regarded as a center axis of the first gray stabilization region, is away from the gray axis in the color space along a vector of about 6 in a B (Black) direction, about 5 in a C (Cyan) direction, about 3 in an R (Red) direction, about 3 in a Y (Yellow) direction, 0 in a G (Green) direction, and 0 in an M (Magenta) direction, and
    wherein distance defined in an a*b* plane of the L*a*b color space is dimensionless.

4. The color image processing device according to claim 1, further comprising:
    a second setting unit configured to set a second gray stabilization region smaller than the first gray stabilization region within the first gray stabilization region; and
    a second transferring unit configured to transfer each color within the first gray stabilization region into the second gray stabilization region.

5. The color image processing device according to claim 4,
    wherein the second transferring unit is configured to convert each color of a luminance within the first gray stabilization region into a color of the same luminance within the second gray stabilization region.

6. The color image processing device according to claim 5,
    wherein the second gray stabilization region includes a single color for each luminance, and
    wherein the second transferring unit is configured to convert all colors of a luminance within the first gray stabilization region into a single color of the same luminance included in the second gray stabilization region.

7. The color image processing device according to claim 1, further comprising a modification unit configured to perform hue modification for each color out of the gray region within the color gamut of the input color image data in response to each color within the gray region being transferred into the first gray stabilization region by the first transferring unit.

8. The color image processing device according to claim 1,
    wherein the first transferring unit is configured to convert each color of a luminance within the gray region into a color of the same luminance within the first gray stabilization region.

9. The color image processing device according to claim 8,
wherein the first gray stabilization region includes a single color for each luminance, and
wherein the first transferring unit is configured to convert all colors of a luminance within the gray region into a single color of the same luminance included in the first gray stabilization region.

10. The color image processing device according to claim 1,
wherein the specifying unit is configured to specify the gray region depending on a type of the input color image data.

11. The color image processing device according to claim 1,
wherein the specifying unit is configured to specify the gray region depending on at least one of a range of the color gamut and a data distribution of the input color image data.

12. A non-transitory computer-readable medium having computer readable instructions stored thereon, which, when executed by a computer, cause the computer to perform steps of:
specifying a gray region including a gray axis within a color gamut of the input color image data in a color space;
setting a first gray stabilization region away from the gray axis in the color space so as to satisfy a predetermined condition; and
transferring each color within the gray region as specified into the first gray stabilization region,
wherein the predetermined condition includes a condition where an axis along the gray axis that can substantially be regarded as a center axis of the first gray stabilization region is away from the gray axis in the color space by more than a maximum hue deviation that could be caused by image formation for colors within the color gamut of the input image data.

13. The non-transitory computer-readable medium according to claim 12,
wherein the step of specifying the gray region includes a step of specifying the gray region depending on at least one of a range of the color gamut and a data distribution of the input color image data.

14. The non-transitory computer-readable medium according to claim 12,
wherein the computer readable instructions further cause the computer to perform a step of performing hue modification for colors forming gradation in the color gamut some of which are included in the gray region such that the colors forming the gradation are out of the gray region before the step of transferring each color within the gray region into the first gray stabilization region.

15. The non-transitory computer-readable medium according to claim 12,
wherein the color space L*a*b color space,
wherein the gray axis satisfies a*=0 and b*=0 in the L*a*b color space,
wherein the predetermined condition includes a condition where an axis along the gray axis that can substantially be regarded as a center axis of the first gray stabilization region is away from the gray axis in the L*a*b color space by a distance of about 6 in a B (Black) direction, about 5 in a C (Cyan) direction, about 3 in an R (Red) direction, about 3 in a Y (Yellow), direction, 0 in a G (Green) direction, and 0 in an M (Magenta) direction, and
wherein distance defined in an a*b* plane of the L*a*b color space is dimensionless.

16. The non-transitory computer-readable medium according to claim 12,
wherein the computer readable instructions further cause the computer to perform steps of:
setting a second gray stabilization region smaller than the first gray stabilization region within the first gray stabilization region; and
transferring each color within the first gray stabilization region into the second gray stabilization region.

17. The non-transitory computer-readable medium according to claim 12,
wherein the computer readable instructions further cause the computer to perform a step of performing hue modification for each color out of the gray region within the color gamut of the input color image data in response to each color within the gray region being transferred into the first gray stabilization region.

18. The non-transitory computer-readable medium according to claim 12,
wherein the step of specifying the gray region includes a step of specifying the gray region depending on a type of the input color image data.

19. A color image processing device configured to process input color image data, comprising:
a memory storing instructions; and
a processor configured to execute the instructions stored in the memory to control the color image processing device to:
specify a gray region including a gray axis within a color gamut of the input color image data in a color space;
set a first gray stabilization region away from the gray axis in the color space so as to satisfy a predetermined condition; and
transfer each color within the gray region specified by the specifying unit into the first gray stabilization region,
wherein the predetermined condition includes a condition where an axis along the gray axis, substantially regarded as a center axis of the first gray stabilization region, is away from the gray axis in the color space by more than a maximum hue deviation of colors within the color gamut of the input image data that could be caused by image formation.

* * * * *